Sept. 8, 1970    F. PETERSON    3,527,554
FEED SUPPORTS FOR MINK CAGES
Filed Oct. 11, 1968
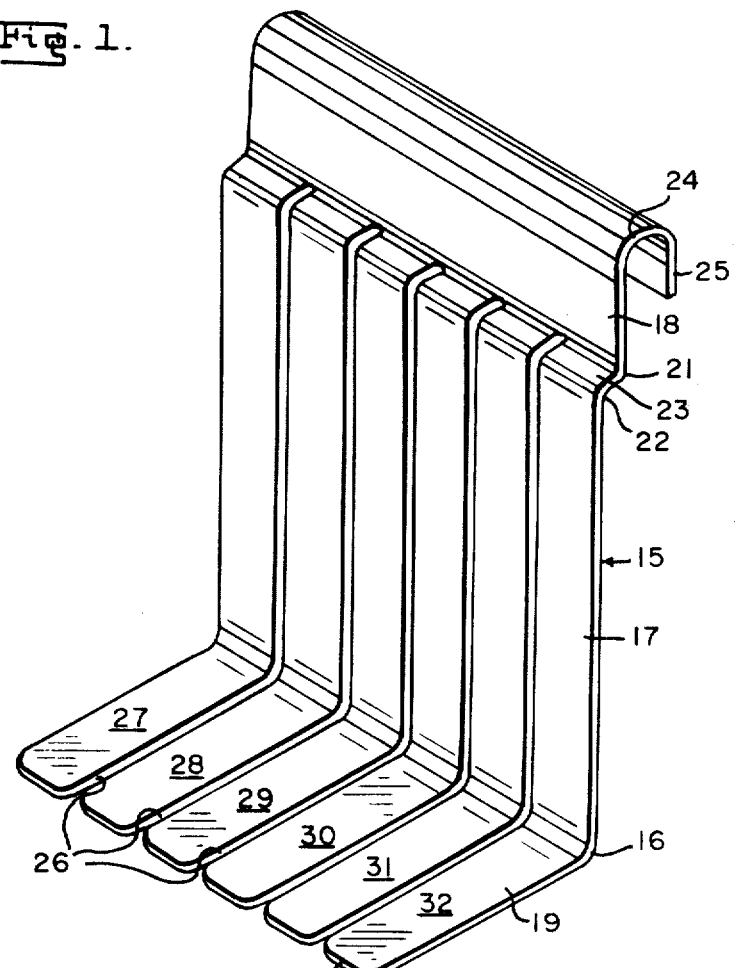
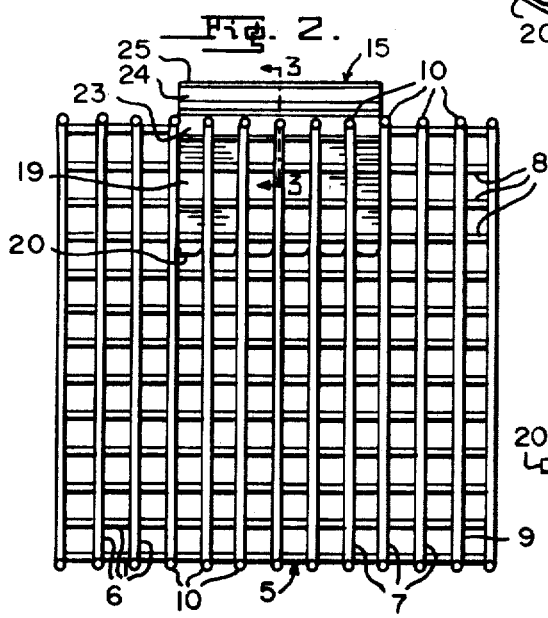
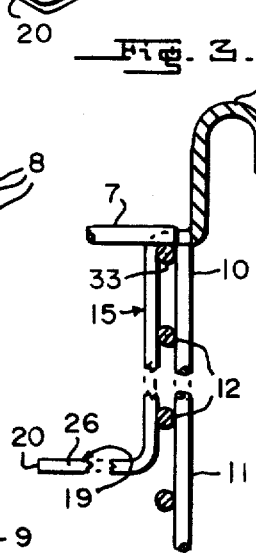
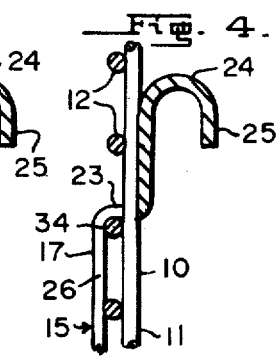

United States Patent Office 3,527,554
Patented Sept. 8, 1970

3,527,554
FEED SUPPORTS FOR MINK CAGES
Fritz Peterson, 27703 Fraser Highway, R.R. 2,
Aldergrove, British Columbia, Canada
Filed Oct. 11, 1968, Ser. No. 766,689
Claims priority, application Canada, Aug. 29, 1968,
028,754
Int. Cl. A01k 5/00
U.S. Cl. 119—18                              7 Claims

ABSTRACT OF THE DISCLOSURE

Disclosed is a feed support for a mesh wire cage, such as a mink cage, comprising an L-shaped sheet including a normally horizontal table portion and a normally vertical hanger portion having an upper margin providing a handle, the hanger portion being bent to provide a laterally offset portion subjacent the handle. In order to permit insertion in and removal of the feed support from a mesh wire cage, the feed support is provided with parallel slits extending from the forward edge of the tray portion through the hanger portion and laterally offset portion, the slits being spaced to match the spacing of the mesh wire of the cage and the presence of the slits in the laterally offset portion permitting insertion of the feed support either at the cage top or at any one of a number of elevations at the side of the cage.

---

My invention relates to improvements in feed supports for mesh wire cages or pens particularly well suited, but not necessarily limited to use in raising mink.

Modern mink cages or pens as used on mink ranches are constructed of welded wire mesh usually of one-inch spacing and when the mink are fed from above through the wire mesh in the top of the pen, a lot of feed is lost by falling through the mesh bottom. For example, some mink will pull down a large chunk of feed and having no safe place to lay it down and eat it piece-meal, will place the feed on the bottom wire whereupon the feed will promptly fall through the wire onto the ground. My estimate is that at least ten percent of the feed is wasted this way. The scarcity of various ingredients required in the mink diet and the attendant high cost of feed results in considerable loss due to direct waste of feed, and the different percentages of lost feed attributable to the different behavior of some mink upsets the general calculations as to the amount of feed required.

Accordingly, in order to eliminate or greatly reduce this feed loss, an important object of my invention is to provide a feed support for a mink pen that will catch falling feed and provide a dining table or tray from which the mink can eat without liability of loss of feed.

Another important object of my invention is the provision of a feed support which is readily adjustable to dispose the dining table or tray portion thereof at any one of a plurality of lower levels, whereby feed can be supported down close to the floor for the convenience of nursing mothers and small kits.

My invention also aims to provide a feed support adaptable to any type of modern mink pen without cutting the wire of the pen; requiring no fastening of the feed support to the pen and no tools for installation; which can be removed for cleaning or other purposes in seconds from outside the pen; which can be disposed in any of a number of positions and heights in the pen; which is of simple, economical, durable, one-piece construction; and which may be made of metal, plastic or other suitable material.

Other objects and advantages of my invention will become apparent during the course of the following detailed description, taken in connection with the accompanying drawing, forming a part of this specification, and in which drawing, FIG. 1 is a perspective view of my feed support.

FIG. 2 is a top plan view of a mink pen and feed support lowered into position from above.

FIG. 3 is a fragmentary vertical sectional view of the mink pen and feed support, the view being taken substantially on the line 3—3 of FIG. 2.

FIG. 4 is a fragmentary vertical sectional view showing the relationship of parts of the mink pen and feed support when the latter is inserted through one of the sidewalls of the mink pen.

In the drawing which, for the purpose of illustration, shows only a preferred embodiment of my invention, and wherein similar reference characters denote corresponding parts throughout the views, the numeral 5 generally designates a conventional mink cage or pen formed of welded wire mesh 6 having one-inch squares formed by parallel longitudinal and transverse wires 7, 8. Referring to FIG. 2, it will be seen that the uppermost wires 7 of the cage or pen top 9 terminate adjacent the top ends of vertical outside wires 10 which, as may be observed by inspection of FIGS. 3 and 4, form a sidewall 11 of the cage or pen 5 along with horizontally disposed, vertically spaced transverse wires 12 that are inwardly of the sidewall 11.

Referring now more particularly to FIG. 1, my feed support 15, may be formed from a sheet of metal, plastic, or other material approximately six inches wide and one foot long, and of heavy enough gauge to stay rigid and keep its shape when bent and cut as shown in FIG. 1.

My feed support 15 is substantially L-shaped and includes a substantially right-angular bend 16 providing a normally vertically depending hanger portion 17 having a top margin 18 opposite said bend 16 and a normally horizontal tray portion 19 having a forward edge 20 opposite said bend 16. Formed in said hanger portion 17 subjacent the top margin 18 are two substantially right-annular bends 21, 22 that provide a normally horizontal, laterally offset portion 23 of a width at least equal to the width of the cage or pen sidewalls 11, that is, the combined diameters of the vertical and horizontal sidewall wires 12, 12 shown in FIGS. 3 and 4. The top margin 18 of the hanger portion 17 preferably terminates in a laterally and downwardly extending substantially semi-circular arcuate bend 24 forming a handle 25. Extending from the forward edge 20 of the tray portion 19 toward and through the bend 16 thence upwardly of the hanger portion 17 are parallel slits 26 spaced to match the one-inch spacing of the mesh wire 6 of the pen 5 and terminating after extending through the laterally offset portion 23, subjacent the top margin 18 of the feed support 15. The width of the slits 26 should be at least equal to and preferably not much greater than the diameter of the pen wire. By this construction, using material having a six-inch width, six blades 27–32 are formed which fit between the wires of the pen 5 and permit insertion of the feed support 15 through the top 9 of the pen 5, starting with the lower forward edge 20 of the tray portion 19 and ending with the upper ends of the slits 26 accommodating the upper wires 7 of the cage top 9 and the laterally offset portion 23 resting on an under wire 33 of the cage top 9 as shown in FIG. 3.

Alternatively, the feed support 15 may be inserted through a sidewall 11 of the pen 5, first by entering the forward edge 20 of the tray portion 19 and then by tilting the device slightly to admit the hanger portion 17 between adjacent horizontal wires of the sidewall while some of the vertical wires continue to move along the slits 26. The insertion of the hanger support is completed when the upper ends of the slits 26, which receive vertical wires 10 of the outside of the cage sidewall 11, engage said vertical wires and the laterally offset portion 23 comes to rest on a horizontal wire 34 forming part of the inside of the cage sidewall 11 shown in FIG. 4.

The use of my feed support 15, by insertion through the cage top 9 will, of course, not interfere with compact placement of a plurality of pens in a row. When my feed support 15 is to be used on the sidewall 11 of an individual pen, such as a breeding pen, the laterally offset portion 23 allows the hanger portion 17 to depend vertically inside the sidewall 11 of the pen and permits the tray portion 19 to be disposed at any selected one of a number of lower levels within the breeding pen. It will thus be seen that I have provided a feed support 15 which enables feed to be dropped or pressed down through the top mesh 6 in freezing temperature directly onto the tray 19 at a convenient level for full-grown mink, or at a lower level for kits old enough to eat solid food, for nursing mother mink, and for sick or rundown mink.

I claim:

1. A feed support for a wire mesh cage comprising a tray portion having a forward edge, a hanger portion extending upwardly from the tray portion opposite the forward edge, an offset portion on the hanger portion remote from and extending in the opposite direction to the tray portion, a top margin on the offset portion spaced from the hanger portion, and said tray, hanger and offset portions having parallel slits extending from the forward edge and terminating near the top margin to admit some of the wires of the wire mesh cage and allow other of said wires to engage said offset portion.

2. A feed support as claimed in claim 1, in which said offset portion has a width substantially equal to the width of a sidewall of the wire mesh cage.

3. A feed support as claimed in claim 1, and including a handle carried by the top margin.

4. A feed support as claimed in claim 1, in which said top margin extends upwardly from the offset portion substantially parallel to the hanger portion.

5. A feed support as claimed in claim 1, and including a bend on the upper end of the top margin and extending in the same direction as the offset portion.

6. A feed support as claimed in claim 5, and including a handle formed by an extension of the bend which projects downwardly substantially parallel to the hanger portion.

7. A feed support for a wire mesh cage comprising a normally horizontal tray portion having a forward edge, a normally vertical hanger portion extending upwardly from the tray portion opposite the forward edge, an offset portion on the upper end of the hanger portion, a top margin on the offset portion extending substantially parallel to the hanger portion, a bend on the upper end of the top margin and extending in the same direction as the offset portion, a handle integrally formed with the bend to extend downwardly in spaced and parallel relation to the top margin, and said tray, hanger and offset portions having parallel slits extending from the forward edge and terminating near the top margin to admit some of the wires of the wire mesh cage and allow other of said wires to engage said offset portion.

References Cited

UNITED STATES PATENTS

| 1,369,079 | 2/1921 | Boothe | 119—51 |
| 1,596,333 | 8/1926 | Boyle | 119—51 |

HUGH R. CHAMBLEE, Primary Examiner

U.S. Cl. X.R.

119—51